US010425837B2

(12) United States Patent
Urzhumov et al.

(10) Patent No.: US 10,425,837 B2
(45) Date of Patent: Sep. 24, 2019

(54) TIME REVERSAL BEAMFORMING TECHNIQUES WITH METAMATERIAL ANTENNAS

(71) Applicant: Searete LLC, Bellevue, WA (US)

(72) Inventors: Yaroslav A. Urzhumov, Bellevue, WA (US); Matthew S. Reynolds, Seattle, WA (US); Guy S. Lipworth, Seattle, WA (US); Russell J. Hannigan, Sammamish, WA (US); Daniel Arnitz, Seattle, WA (US); Joseph Hagerty, Seattle, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

(21) Appl. No.: 15/722,973

(22) Filed: Oct. 2, 2017

(65) Prior Publication Data

US 2019/0104421 A1  Apr. 4, 2019

(51) Int. Cl.
| | | |
|---|---|---|
| *H04B 1/00* | (2006.01) |
| *H04W 16/28* | (2009.01) |
| *H04B 7/06* | (2006.01) |
| *H04B 17/10* | (2015.01) |
| *H01Q 3/44* | (2006.01) |
| *H01Q 15/00* | (2006.01) |
| *H01Q 1/36* | (2006.01) |

(52) U.S. Cl.
CPC ............ *H04W 16/28* (2013.01); *H01Q 3/44* (2013.01); *H01Q 15/0086* (2013.01); *H04B 7/0617* (2013.01); *H04B 17/104* (2015.01); *H01Q 1/364* (2013.01)

(58) Field of Classification Search
CPC .......... H04B 1/04; H04B 1/30; H04B 7/1858; H04B 7/18591
USPC ........................................................ 455/63.4
See application file for complete search history.

(56) References Cited

U.S. PATENT DOCUMENTS

| | | |
|---|---|---|
| 5,005,418 A | 4/1991 | Anderson |
| 5,208,653 A | 5/1993 | Mark et al. |
| 5,920,285 A | 7/1999 | Benjamin |
| 5,930,314 A | 7/1999 | Lanza |
| 6,876,337 B2 | 4/2005 | Larry |
| 2002/0130804 A1 | 9/2002 | McMakin et al. |
| 2002/0158798 A1 | 10/2002 | Chiang et al. |
| 2003/0123565 A1 | 7/2003 | Fukuda et al. |
| 2004/0162034 A1 | 8/2004 | Parker |
| 2007/0191064 A1 | 8/2007 | Skarby et al. |

(Continued)

OTHER PUBLICATIONS

PCT International Search Report; International App. No. PCT/US2018/053759; dated Jan. 31, 2019; pp. 1-3.

*Primary Examiner* — Ajibola A Akinyemi

(57) ABSTRACT

In one embodiment, a source device includes one or more tunable elements associated with an antenna. The source device is operable to modulate an impedance of one or more tunable elements based on a sequence of tuning vectors, measure a reference signal amplitude for each tuning vector, and determine field amplitudes for an array of reference points that circumscribe at least a portion of the source device based on the reference signal amplitude for each tuning vector. The source device is further operable to determine a target tuning vector that defines a target radiation pattern based on the field amplitudes, and transmit a target signal to a target device based on the target radiation pattern.

18 Claims, 9 Drawing Sheets

(56) References Cited

U.S. PATENT DOCUMENTS

| | | |
|---|---|---|
| 2008/0048917 A1 | 2/2008 | Achour et al. |
| 2008/0052505 A1 | 2/2008 | Theobald |
| 2008/0054899 A1* | 3/2008 | Aksoy ................ G01R 33/5611 324/307 |
| 2008/0204347 A1 | 8/2008 | Alvey et al. |
| 2008/0292011 A1 | 11/2008 | Yang |
| 2009/0284431 A1 | 11/2009 | Meharry et al. |
| 2010/0301971 A1 | 12/2010 | Yonak et al. |
| 2011/0003608 A1 | 1/2011 | Forenza et al. |
| 2011/0086598 A1 | 4/2011 | Ali et al. |
| 2012/0212328 A1 | 8/2012 | Blair et al. |
| 2013/0208332 A1 | 8/2013 | Yu et al. |
| 2013/0266319 A1 | 10/2013 | Bodan et al. |
| 2013/0335256 A1 | 12/2013 | Smith et al. |
| 2014/0056378 A1 | 2/2014 | Harel et al. |
| 2014/0128032 A1* | 5/2014 | Muthukumar ........... H01Q 3/00 455/411 |
| 2014/0211298 A1 | 7/2014 | Sayyah et al. |
| 2014/0231627 A1 | 8/2014 | Wakatsuki et al. |
| 2014/0266946 A1 | 9/2014 | Bily et al. |
| 2014/0268436 A1 | 9/2014 | Du et al. |
| 2014/0306784 A1 | 10/2014 | Broyde et al. |
| 2015/0109181 A1 | 4/2015 | Hyde et al. |
| 2015/0162658 A1 | 6/2015 | Bowers et al. |
| 2016/0044296 A1 | 2/2016 | Sun et al. |
| 2016/0149312 A1 | 5/2016 | Henry et al. |
| 2016/0190698 A1 | 6/2016 | Andresen et al. |
| 2016/0239060 A1 | 8/2016 | Koob et al. |
| 2017/0063344 A1 | 3/2017 | Broyde et al. |
| 2017/0163327 A1* | 6/2017 | Yang .................... H04B 7/0413 |
| 2017/0229774 A1 | 8/2017 | Schuehler et al. |
| 2017/0351102 A1 | 12/2017 | Wertsberger |

\* cited by examiner

TIME REVERSAL BEAMFORMING TECHNIQUES WITH METAMATERIAL ANTENNAS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None.

RELATED APPLICATIONS

This application is related to U.S. patent application Ser. No. 15/183,291, filed on Jun. 15, 2016, entitled METHODS AND SYSTEMS FOR COMMUNICATION WITH BEAMFORMING ANTENNAS, and published as U.S. Pat. Pub. No. 2006/0373181; U.S. patent application Ser. No. 15/253,606, filed on Aug. 31, 2016, entitled TUNABLE MEDIUM LINEAR CODER; U.S. patent application Ser. No. 15/409,401, filed on Jan. 18, 2017, entitled TUNABLE MEDIUM LINEAR CODER; U.S. patent application Ser. No. 15/586,157, filed on May 3, 2017, entitled DYNAMIC METAMATERIAL CODED-APERTURE IMAGING; U.S. patent application Ser. No. 15/048,878 filed on Feb. 19, 2016, entitled TRANSMITTER CONFIGURED TO PROVIDE A CHANNEL CAPACITY THAT EXCEEDS A SATURATION CHANNEL CAPACITY, and published as U.S. Pat. Pub. No. 2017/0244454; U.S. patent application Ser. No. 15/048,880 filed on Feb. 19, 2016, entitled RECEIVER CONFIGURED TO PROVIDE A CHANNEL CAPACITY THAT EXCEEDS A SATURATION CHANNEL CAPACITY, and published as U.S. Pat. Pub. No. 2017/0244453; U.S. patent application Ser. No. 15/048,884 filed on Feb. 19, 2016, entitled SYSTEM WITH TRANSMITTER AND RECEIVER REMOTE FROM ONE ANOTHER AND CONFIGURED TO PROVIDE A CHANNEL CAPACITY THAT EXCEEDS A SATURATION CHANNEL CAPACITY, and published as U.S. Pat. Pub. No. 2017/0244450; U.S. patent application Ser. No. 15/048,888 filed on Feb. 19, 2016, entitled SYSTEM WITH TRANSMITTER AND RECEIVER CONFIGURED TO PROVIDE A CHANNEL CAPACITY THAT EXCEEDS A SATURATION CHANNEL CAPACITY, and published as U.S. Pat. Pub. No. 2017/0244455; U.S. patent application Ser. No. 14/918,331, filed on Oct. 20, 2015, entitled TUNABLE METAMATERIAL SYSTEMS AND METHODS, and published as U.S. Pat. Pub. No. 2017/0069966; U.S. patent application Ser. No. 14/986,255, filed on Dec. 31, 2015, entitled WIRELESS POWER TRANSFER USING TUNABLE METAMATERIAL SYSTEMS AND METHODS, and published as U.S. Pat. Pub. No. 2017/0069969; U.S. patent application Ser. No. 14/986,258, filed on Dec. 31, 2015, entitled WIRELESS POWER TRANSFER USING TUNABLE METAMATERIAL SYSTEMS AND METHODS, and published as U.S. Pat. Pub. No. 2017/0069973; U.S. patent application Ser. No. 15/345,251, filed on Nov. 7, 2016, entitled MASSIVELY MULTI-USER MIMO USING SPACE TIME HOLOGRAPHY; and U.S. patent application Ser. No. 15/409,394, filed on Jan. 18, 2017, entitled MASSIVELY MULTI-USER MIMO USING SPACE TIME HOLOGRAPHY are related to the present application. The content for each of foregoing applications and application publications is incorporated herein by reference

TECHNICAL FIELD

The present disclosure generally relates to wireless signal transmission, and more particularly, to techniques for time reversal beamforming with metamaterial antennas.

BACKGROUND

Advances in modern technology, network connectivity, processing power, convenience, and the like, support an ever increasing number of interconnected devices such as mobile devices, cell phones, tablets, smart-cars, wearable devices, etc. In turn, these advances present new challenges and create new opportunities for network operators and third party service providers to efficiently target, communicate, or otherwise exchange signals between networked devices. Indeed, modern approaches for wireless signal transmission must often account for complex conditions and dynamic factors such as network traffic, signal propagation through various media, spectrum/frequency constraints for signal transmission, and the like.

One approach that attempts to address some of these challenges includes beamforming, and more specifically, time reversal beamforming. Beamforming generally refers to a signal processing technique used in sensor arrays for directional signal transmission or reception, and time reversal beamforming particularly exploits reciprocity (or time-invariance) for electromagnetic propagation channels that are not "polluted" by non-time-invariant components (such as EM nonlinearities and DC magnetic field generators). With respect to operations for time reversal beamforming, a receiver device temporarily transmits signals that are received by a transmitter device (e.g., beamforming device). The transmitter or beamforming device measures and records amplitudes at its radiating elements, and further applies amplitude and phase modulations to a transmission signal to produce a phase-conjugate signal of the prior measured and recorded field amplitudes. While conventional devices, such as Active/Passive Electronically Steerable Array (AESA/PESA), typically include modular structures which make amplitude measurements simple, metamaterial components often do not allow direct access to radiating elements and/or do not support direct amplitude measurements. In fact, in many instances involving metamaterial components, there are no well-defined radiating elements (e.g., as in a tightly-coupled array of scattering elements coupled to a leaky waveguide). Accordingly, many challenges arise when employing metamaterial components for beamforming signals.

SUMMARY

A source device can include one or more tunable elements associated with an antenna where each tunable element can further include sub-wavelength elements associated with a variable impedance element. The impedance of one or more of the variable impedance elements may be adjusted through one or more impedance control inputs and/or during a manufacturing process. In operation, the source device is operable to receive reference signals (e.g., transmitted by a target device), determine a desired beam-formed signal (e.g., a target signal) based on the reference signals, and transmit the beam-formed signal or target signal to the target device.

In one exemplary embodiment, the source device is operable to modulate an impedance of one or more tunable elements based on a sequence of tuning vectors, measure a reference signal amplitude for each tuning vector, and determine field amplitudes for an array of reference points that circumscribe at least a portion of the source device based on the reference signal amplitude for each tuning vector. The source device is further operable to determine a target tuning vector that defines a target radiation pattern based on the field amplitudes, and transmit a target signal to a target device based on the target radiation pattern.

In other exemplary embodiments, one or more hardware, software, and/or firmware solutions may be employed to perform the beam-forming techniques of the source device, as described herein. For instance, a computer-readable medium (e.g., a non-transitory computer-readable medium) may have instructions that are executable by a processor to form a specific radiation pattern based on the reference signal. The executed operations or method steps may include determining a scattering matrix (S-Matrix) of field amplitudes (e.g., electric field amplitudes) for the plurality of virtual ports used to model the antenna system. These virtual ports, as discussed in greater detail herein, define a surface that circumscribes at least a portion of the source device, preferably based on a Nyquist sampling rate of one reference point per $(\lambda/2)^2$. The executed operations may further include determining a target tuning vector that defines a target radiation pattern based on the S-Matrix of field amplitudes and transmitting a target signal to the target device based on the target radiation pattern.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
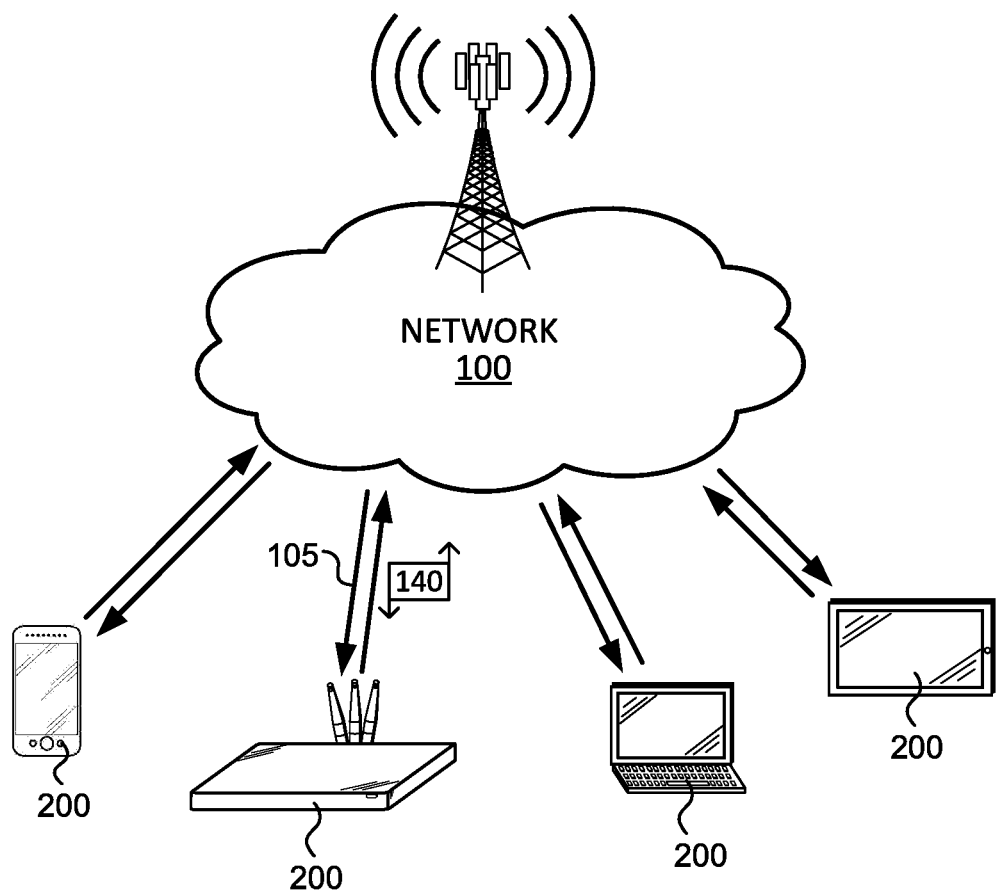
FIG. 1 illustrates a schematic block diagram of an example communication network.

The subject disclosure describes improved techniques for beamforming wireless signals by, for example, metamaterial devices (e.g., metamaterial antenna, tunable metamaterial elements or coders, etc.). Notably, the techniques disclosed herein may be employed in a variety of applications such as wireless communications, heating, wireless power transmission, far field directed beams, 3D tomography, RADAR, and the like. While certain applications are discussed in greater detail herein, such discussion is for purposes of explanation, not limitation.

For example, many of the above mentioned applications can be employed in a communication network environment. In this context, a communication network is a geographically distributed collection of devices or nodes interconnected by communication links and segments for transporting data between end nodes or terminal devices, such as computers, workstations, mobile devices, sensors, and so on. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 illustrates a schematic block diagram of an example communication network 100 comprising various nodes/devices 200 (described in greater detail with respect to FIG. 2 below) interconnected by one or more links 105, which represent various methods of communication. For instance, links 105 may be wired links or shared media (e.g., wireless links, PLC links, etc.) where certain nodes 200, such as, e.g., routers, sensors, base stations, user equipment, etc., may be in communication with other nodes 200 based on distance, signal strength, current operational status, location, etc.

Signals 140 represent traffic and/or messages (e.g., data packets) sent between the devices/nodes over communication network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. Moreover, signals 140 may represent wireless signals which are transmitted according to the improved beamforming techniques described herein.

Those skilled in the art will understand that any number of nodes, devices, links, etc. may be used in the computer network, and that the view shown herein is for simplicity. Also, those skilled in the art will further understand that while network 100 is shown with the nodes/devices connected to the network, such network is merely an example illustration that is not meant to limit the disclosure.

Figure 2:
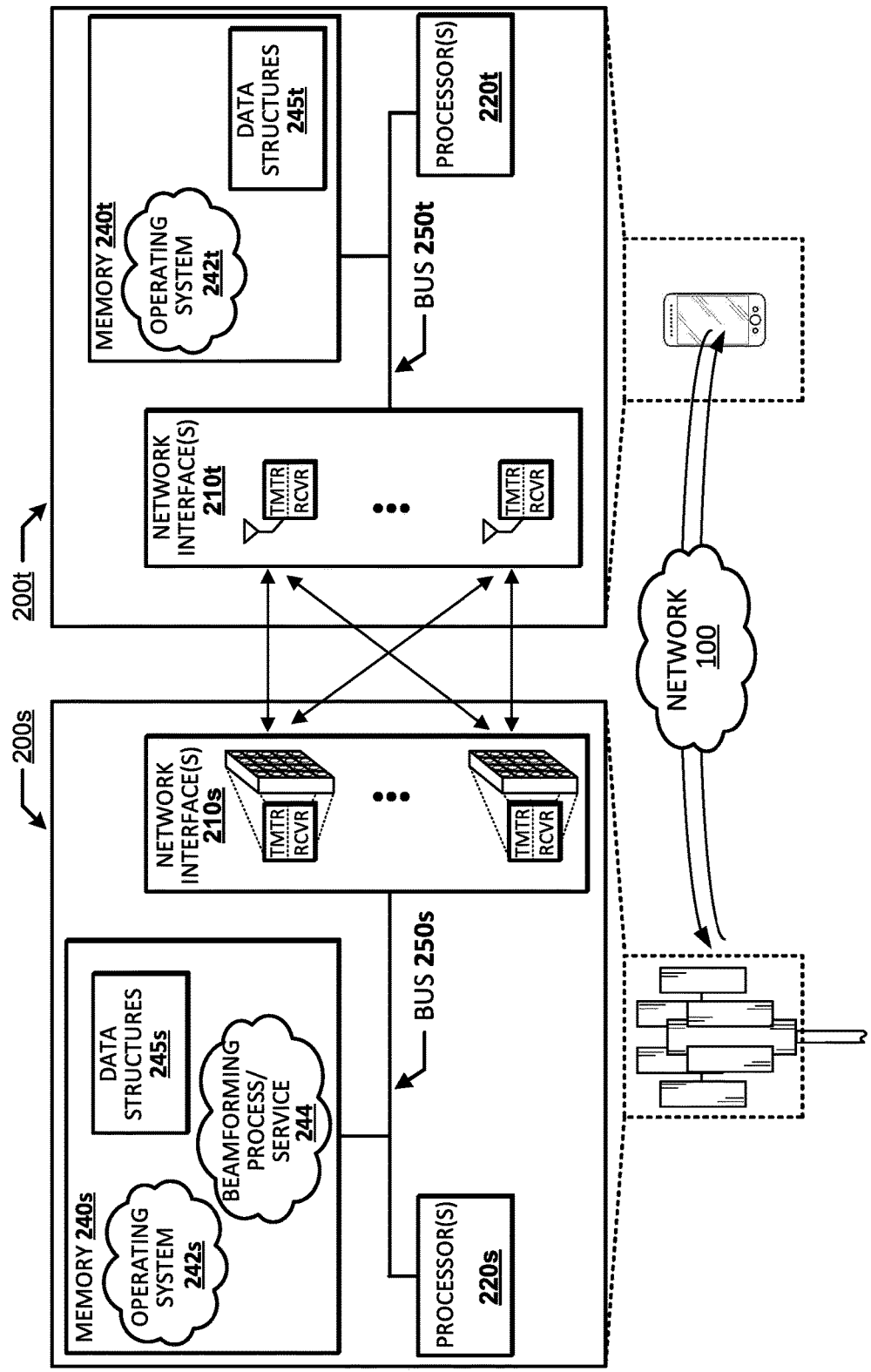
FIG. 2 illustrates a schematic block diagram of example network devices/nodes, including a source device and a target device.

FIG. 2 illustrates a schematic block diagram of example network devices/nodes that communicate over communication network 100. As shown, the example network devices include a source device 200s, which represents a base station, and a target device 200t, which represents user equipment (UE). As mentioned above, although the illustrated devices are shown as configured for operations in specific environments, such devices are shown for purposes of discussion, not limitation, and further, it is appreciated the improved beamforming techniques described herein may be employed by any number of devices operating in a variety of environments, as is appreciated by those skilled in the art.

Source device 200s and target device 200t comprise similar and/or complimentary hardware/software components that support signal exchanges over network 100. As shown, source device 200s and target device 200t includes one or more network interfaces 210s/210t, at least one processor 220s/220t, and a memory 240s/240t interconnected by a system bus 250s/250t.

Network interface(s) 210s/210t contain the mechanical, electrical, and signaling circuitry for communicating data over links coupled to communication network 100. For example, network interfaces 210s/210t may be configured to transmit and/or receive data using a variety of different communication protocols, as will be understood by those skilled in the art. As shown, network interfaces 210s include a metamaterial components such as metamaterial antennas, tunable metamaterial elements (e.g., coders), and so on. As shown here, the metamaterial components of network interfaces 210s are represented by an array of sub-wavelength antenna elements associated with variable lumped impedance elements, discussed in greater detail below.

Memory 240s/240t comprises a plurality of storage locations such as data structures 245s/245t, which are addressable by processor 220s/220t. In this fashion, processor 220s/220t comprises necessary elements or logic adapted to execute the software programs and manipulate data structures 245/245t.

An operating system 242s/242t, portions of which are typically resident in memory 240s/240t (and executed by processor 220s/220t), functionally organizes respective devices by, inter alia, invoking operations in support of software processes and/or services executing on the device. For example, these software processes and/or services include operations to support multiple-input multiple-output (MIMO) communications, encoding/decoding symbols, spatial processing (e.g., precoding symbols, etc.), modulating, de-modulating, converting, amplifying, filtering, and so on.

In addition, memory 240s of source device 200s includes an illustrative "beamforming" process/service 244, which provides instructions for performing the disclosed improved techniques for beamforming wireless signals using metamaterial components (e.g., antenna, tunable metamaterial elements (e.g., coders, etc.), and the like. Note that while process 244 is shown in centralized memory 240s, some embodiments employ process 244 over distributed network of devices.

Similar to the beamforming operations discussed above, beamforming process 244 employs a time reversal beamforming process that exploits reciprocity (or time-invariance) for electromagnetic propagation channels that are not "polluted" by non-time-invariant components. For example, target device 200t temporarily transmits signals (e.g., reference signals) that are received by source device 200s. However, as mentioned, network interfaces 210s include metamaterial components which do not support direct amplitude measurements of the reference signals. Instead, beamforming process 244 includes instructions that cause source device 200s to modulate an impedance of network interfaces 210s (e.g., metamaterial components) to receive the reference signals over a sequence of tuning vectors. Source device 200s determines field amplitudes for an array of reference points (e.g., virtual reference ports) that circumscribe at least a portion of the source device based on reference signal amplitudes for each tuning vector. For example, the array of reference points may define a surface that circumscribes the antenna based on a Nyquist sampling rate of one reference point per $(\lambda/2)^2$. In addition, source device 200s further determines a target tuning vector that defines a target radiation pattern based on the field amplitudes for the array of reference points and transmits a target signal from the source device to a target device based on the target radiation pattern. In this fashion, beamforming process 244 facilitates beamforming signals (e.g., wireless power signals, communication signals, energy beams, etc.) for devices having metamaterial components. These and other features are described in greater detail below.

Notably, various processor and memory types, including computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220s/220t can include one or more programmable processors, e.g., microprocessors or microcontrollers, or fixed-logic processors. In the case of a programmable processor, any associated memory, e.g., memory 240s/240t, may be any type of tangible processor readable memory, e.g., random access, read-only, etc., that is encoded with or stores instructions that can implement program modules thereon. Processor 220s/220t can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform functions described herein.

Figure 3:
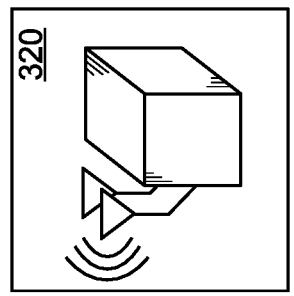
FIG. 3 illustrates a schematic block diagram of communications between a source device and a target device, showing the target device transmitting a reference signal to the source device.
Figure 3:
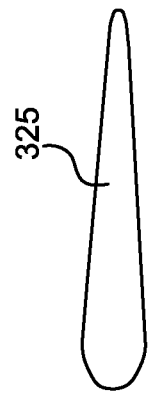
Figure 3:
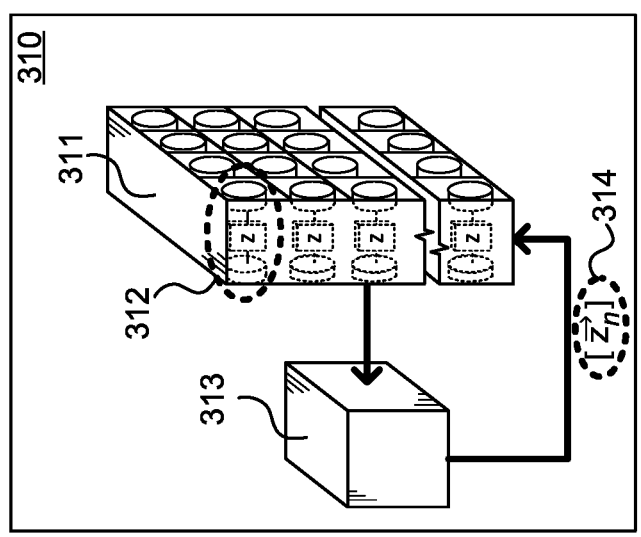

FIG. 3 illustrates a schematic block diagram 300 of communications between a source device 310 and a target device 320, where target device 320 transmits a reference signal 325 to source device 310 over a network such as communication network 100 (not shown).

Source device 310 includes a network interface or antenna 311, comprising an array of metamaterial elements 312. Metamaterial elements 312 can be tunable two-dimensional meta-surface objects, where each metamaterial element 312 forms a "unit cell" that may be mapped and/or modeled as a port "$N_a$" (e.g., a lumped port, a wave port, etc.) having respective lumped impedance elements "z". Metamaterial elements 312 can include, for example, resistors, capacitors, inductors, varactors, diodes, transistors, alternative circuit components (e.g., discrete or integrated), and the like, as is appreciated by those skilled in the art.

Moreover, metamaterial elements 312 can be passive, active, or variably passive-active and, for a given frequency, the respective impedance element z may be described by a complex value. In this fashion, a positive integer may be used to describe a portion of the tunable impedance values for the metamaterial elements 312. Alternatively, (or in addition), tunable impedance values for respective impedance elements may be described by complex vector, $[\vec{z}_n]$. Although metamaterial components 312 are represented by respective one lumped impedance elements, it is also appreciated antenna 311 can include a common transmission line (TL) or wave guide (not shown) coupled to one or more metamaterial components 312 via the lumped impedance elements.

Preferably, metamaterial components 312 form sub-wavelength antenna elements with inter-element spacing that is substantially less than a free-space wavelength for an operating frequency or frequency range of antenna 311. For example, the inter-element spacing may be less than one-half or one-quarter of the free-space operating wavelength or frequency, which can include, but is not limited to microwave frequencies, very low frequencies, low frequencies, medium frequencies, high frequencies, very high frequencies, ultra-high frequencies, super-high frequencies, and extremely high frequencies or millimeter waves.

In operation, target device 320 transmits or radiates reference signal 325 at an arbitrary (but sufficient) power level to reach source device 310. Source device 310 receives reference signal 325 over a sequence of tuning vectors. For example, a controller 313 (e.g., a processor such as processor 220s) effectively "tunes" antenna 311 to different frequencies by adjusting impedance values for one more metamaterial components 312, individually or collectively using on control input(s) 314 that correspond to impedance values. In this fashion, controller 313 tunes antenna 311 to receive reference signal 325 over the sequence of tuning vectors. Put differently, target device 320 continuously transmits reference signal 325 while source device 310 is tuned to each impedance value and/or the sequence of tuning vectors of control inputs 314, described in greater detail below.

Notably, tuning may be a one-time static operation performed during the manufacturing of antenna 311, or tuning may be a dynamic process controlled by the one or more control inputs. Here, metamaterial components 312 are dynamically manipulated in real-time to receive signals over a wide range of frequencies as well as to transmit or radiate signals over a wide range radiation patterns. The number of metamaterial components 312, associated impedance elements "z", and the number of impedance control inputs may be a 1:1:1 ratio or an X:Y:Z, where X, Y, and Z are integers that may or may not be equal. For instance, in one embodiment there may be a 1:1 mapping of impedance elements to sub-wavelength antenna elements while there is only one-tenth the number of impedance control inputs.

Figure 4:
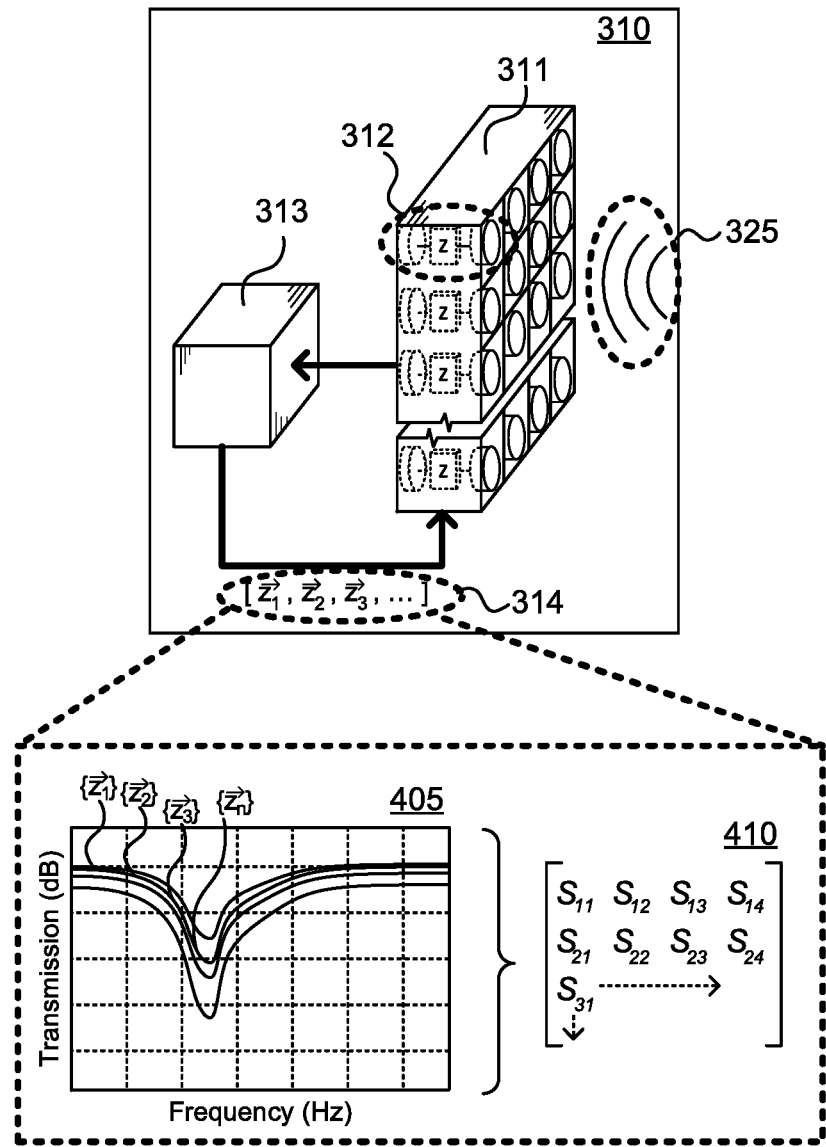
FIG. 4 illustrates a schematic block diagram of an antenna of the source device shown in FIG. 3, showing metamaterial components of the antenna tuned to receive the reference signal over a sequence of tuning vectors.

FIG. 4 illustrates a schematic block diagram of antenna 311, showing metamaterial components 312 tuned to receive reference signal 325 over the sequence of tuning vectors of control inputs 314. Here, source device 310 measures reference signal amplitudes or field amplitudes for each tuning vector and for ports ($N_a$) mapped to respective metamaterial components 312. In turn, these field amplitudes define, in part, radiation patterns for received reference signals over the sequence of tuning vectors $[\vec{z}_n]$ for a frequency range. Notably, the simplest measurements may be represented by an antenna having one input/output port ($N_{i/o}$=1), with a signal amplitude measurement for each impedance vector, however it is also appreciated any the antenna may have any number of input/output ports. These reference signal amplitudes are resented by a signal amplitude graph 405 and are used, in part, to calculate parameters for a corresponding scattering matrix (S-matrix) 410.

S-matrix 410 comprises scattering parameters $S_N$, which represent a complex magnitude of field (e.g., electric field) at a particular location in space, given by a radius vector $\vec{r}_0$, normalized to the field magnitude at a corresponding antenna port. An absolute value $|S_N|$, or an algebraically convenient quantity $|S_{1N}|^2$, quantifies the quality of field concentration at a given point (e.g., antenna ports $N_a$, which are mapped to respective metamaterials components 312). As discussed in greater detail below, maximizing this quantity (or minimizing in the case of forming nulls) is part of a generalized beamforming process.

In operation, source device 310 tunes antenna 311 based on a sequence of tuning vectors $[\vec{z}_n]$, where the tuning vectors adjust impedance values (z) for corresponding metamaterial components 312. The tuning vectors include $N_{mod}$ vectors, where each tuning vector $\vec{z}$ is defined, in part, by a length $N_{tun}$. The tuning vectors may be predefined, selected from a list of options, and/or determined dynamically based on additional measurements performed by source device 310, as is appreciated by those skilled in the art.

Source device 310 further computes scattering or S-parameters for S-matrix 410, based on a model of antenna ports, $N_a$ (e.g., a lumped port model, a wave port model, etc.), an impedance matrix (Z-matrix) of known impedance values for tuning vectors $[\vec{z}_n]$, and an admittance matrix (Y-matrix) of admittance parameters, where the Y-matrix is an equivalent inverse matrix of the Z-matrix such that $Y=Z^{-1}$.

The S-Matrix may be expressed by a relationship between the Z or Y matrices and the values of the impedance elements as follows:

$$S=(\sqrt{y}Z_s\sqrt{y}-1)(\sqrt{y}Z\sqrt{y}+1)^{-1}=(1-\sqrt{z}Y\sqrt{z})(1+\sqrt{z}Y\sqrt{z})^{-1}$$

Where "1" represents a unit matrix of size N.

Notably, impedance values for the Z-matrix and scattering parameters for the Y-matrix are typically defined in terms of $Z_{nm}=V_n/I_m$, where $V_n$ and $I_m$ represent a voltage at antenna port "n" and a current at port "m", measured with all other ports open. That is, assuming port currents $I_k=0$ for all k not equal to m or n. Similarly, for the Y-Matrix, $Y_{nm}=I_m/V_n$, measured with all other ports open. Again, that is assuming port currents $I_k=0$ for all k not equal to m or n.

The S-matrix represents port-to-port transmission of off-diagonal elements in an N-port antenna such as antenna 311. In a lossless system, the S-matrix is necessarily unitary. If elements $S_n$ are singular values of the S-matrix, which are the same as the magnitudes of the eigenvalues, it can be stated that in a lossless system, all $S_n=1$. In general, if $S_{max}$ is the largest singular value, then for a passive lossy system it can be stated that $S_n \leq S_{max} \leq 1$.

In an active system, these bounds still hold, however $S_{max}$ can now exceed unity, representing an overall power gain for at least one propagation path. The Z and Y matrices are diagonal in the same basis represented by a unitary matrix:

$$U(U^\dagger=U^{-1}), \text{ such that } Z=U^\dagger Z_d U, \ Y=U^\dagger Y_d U$$

Where "d" indicates a diagonal matrix comprising complex-valued eigenvalues.

In general, unless $\sqrt{z}$ is proportional to a unit matrix, i.e., all lumped element impedances are equal, the S-Matrix will not be diagonal in the U-basis. In the U-basis, the general form of the S-Matrix is:

$$S=U^\dagger(1-\zeta Y_d\zeta)(1+\zeta Y_d\zeta)^{-1}U$$

Where a new non-diagonal matrix $\zeta=U\sqrt{z}U^\dagger$ is used such that:

$$\sqrt{z}=U^\dagger\zeta U$$

Where $Y_d$ is diagonal (though not generally commutative with $\zeta$).

The S-matrix can be numerically evaluated with any desired accuracy by solving N linear system problems, e.g., $Z_{nm}=V_n/I_m$ or $Y_{nm}=m/V_n$, and the associated open port conditions described above. Such problems may be solved with Finite Element Methods (FEM) or finite-difference time-domain (FDTD) based solvers for linear electromagnetic systems. Examples of commercially available solvers include ANSYS HFSS, COMSOL, and CST. These numerical simulations incorporate various fine effects of the near-field and far-field interactions between various parts of the system, regardless of complexity.

The impedance values of the Z-matrix may also be mapped to scattering parameters of the S-matrix by a non-linear mapping. In some instances, this mapping may be expressible as a single- or multivariate polynomial. The polynomial may be of a relatively low order (e.g., 1-5). The S-matrix may comprise N values and the Z-matrix may comprise M values, where N and M are both integers and equal to one another, such that there is a 1:1 mapping of S-matrix values and Z-matrix values. Any of a wide variety of mapping is possible. For example, the S-matrix may comprise N values and the Z-matrix may comprise M values, where N squared is equal to M. Alternatively, there may be a 2:1 or 3:1 mapping or a 1:3 or 2:1 mapping.

Figure 5:
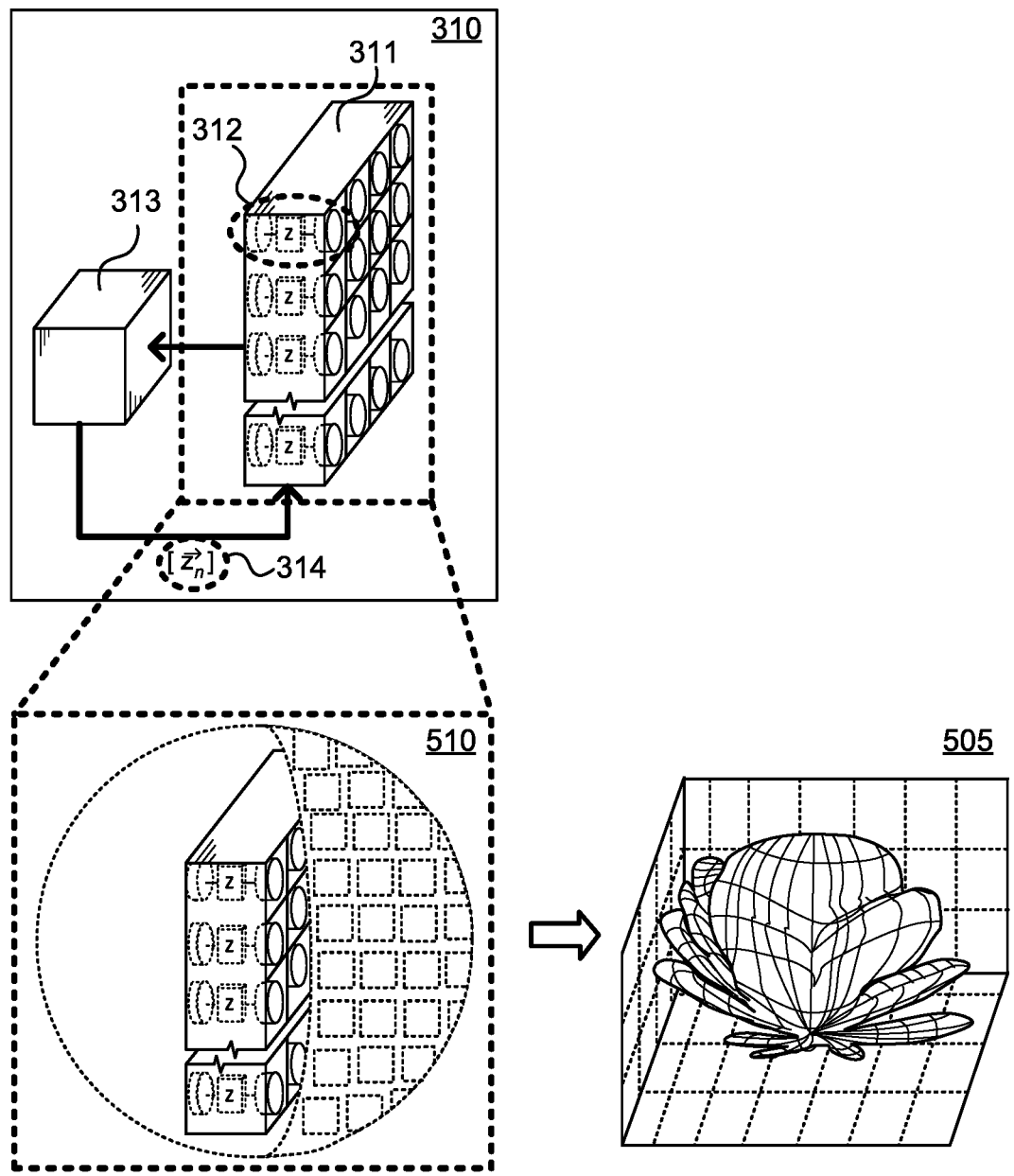
FIG. 5 illustrates a schematic block diagram of an array of reference points or virtual ports circumscribing at least a portion of the antenna of the source device shown in FIG. 3.

FIG. 5 illustrates a schematic block diagram of an array of reference points or virtual ports 510 that circumscribe at least a portion of antenna 311. Here, virtual ports 510 define a surface that covers a transmission aperture of antenna 311. As mentioned above, these virtual ports 510 are preferably defined and spaced about the transmission aperture based on a Nyquist sampling rate of one reference point per $(\lambda/2)^2$.

Virtual ports 510 represent probes or field sampling points that conceptually quantify field intensities (e.g., complex field amplitudes), represented by an electromagnetic field graph 505, at a particular location. Each virtual port may be assumed infinitesimal in area and/or volume and located at a particular radius-vector r.relative to antenna 311 and/or metamaterial components 312. Preferably, virtual ports 510 are positioned or defined at a Nyquist spatial resolution (half-wavelength) or denser and should surround or substantially surround a transmit aperture of antenna 311 in order to provide sufficient samples for a given electromagnetic field. As discussed in greater detail herein, the field intensities are calculated for each reference point or virtual port 510, which field intensities are used to determine a desired radiating pattern for a target signal.

In operation, source device 310 computes S-parameters based on known Z-matrix values as well as the known tunable impedance vector (which describe its tunable elements), as discussed above. For example, computing a complex field amplitude at an $i^{th}$ virtual port, which is implied to represent the field value at the corresponding reference point collocated with that virtual port, may be described by the following equation:

$$E_i=S_{i,o}*E_o$$

Where $S_{i,o}$ represents a known component of the S-matrix (computed from the known Z-matrix of the antenna and the known values tunable impedance vector), $E_o$ is the complex amplitude measured at an output port, and $E_i$ is the complex amplitude at the i-th virtual port, which is implied to represent the field value or field intensity at the corresponding reference point collocated with that virtual port.

Here, $E_o$ is measured, $S_{i,o}$ (S-parameters/S-matrix elements) are computed. In this fashion, the measured complex amplitudes are combined with the computed S-matrix values to yield field amplitudes at virtual ports where measurements didn't actually happen (e.g., $i^{th}$ virtual ports).

Notably, the number of virtual ports 510 corresponds, in part, to a number of tuning vectors ($N_{mod}$). For example, if the number of virtual ports is represented by $N_{fs}$, for $N_{i/o}=1$, then $N_{mod}=N_{fs}$ or greater to ensure the number of reference points (e.g., data points) are greater than a number of unknowns to be determined ($N_{fs}$).

Here, the field amplitudes at the virtual ports correspond to an electromagnetic radiation or field pattern represented by graph 505. These field amplitudes are further used to determine a desired impedance vector for generating a target signal. That is, source device 310 tunes antenna 311 based on the desired impedance vector [$\vec{z}_n$] to reproduce the reference signal 325 as a target signal (e.g., a phase conjugate signal), as is appreciated by those skilled in the art.

Figure 6:
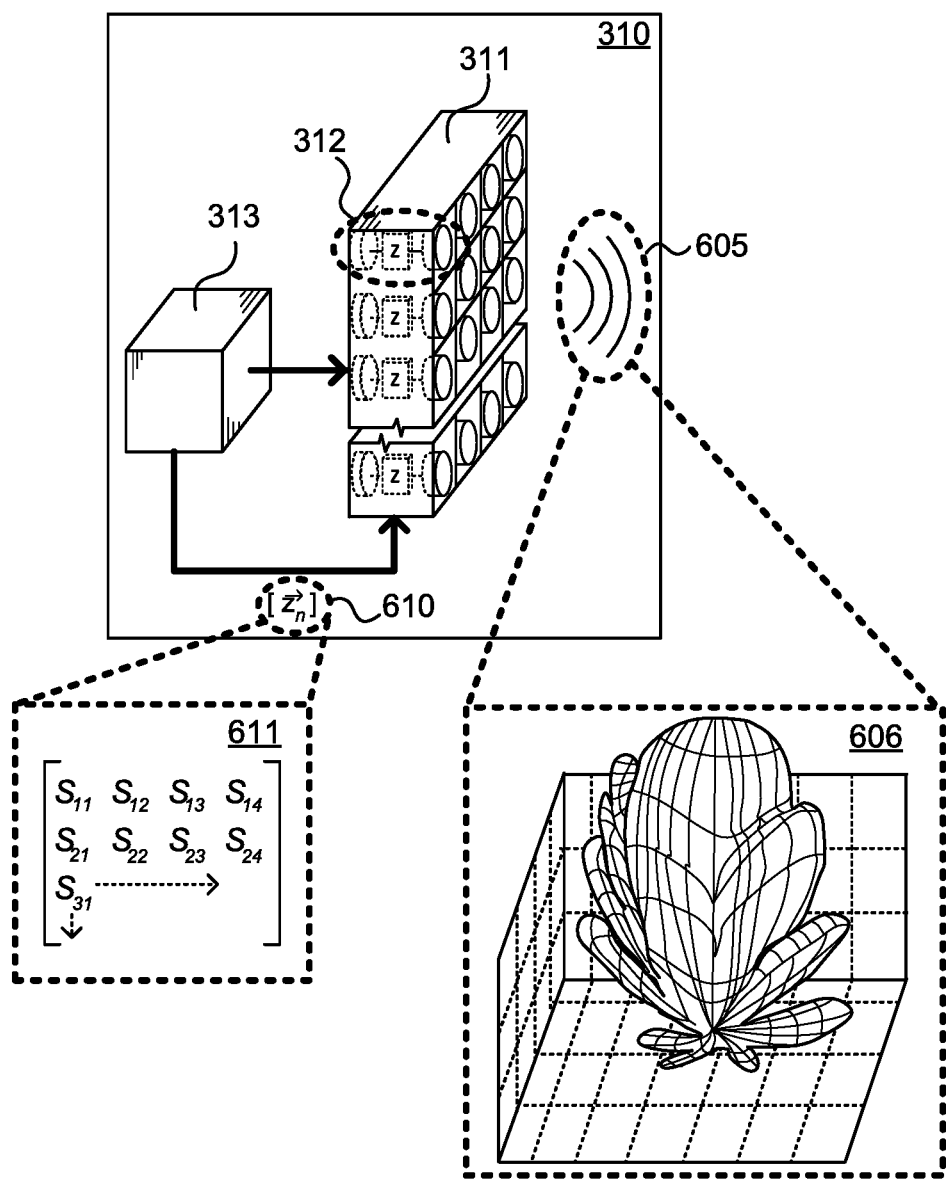
FIG. 6 illustrates a schematic block diagram of the antenna of the source device shown in FIG. 3, showing metamaterial components of the antenna tuned to generate a target signal based on a target tuning vector.

FIG. 6 illustrates a schematic block diagram of source device 310, showing metamaterial components 312 of antenna 311 tuned to generate a target signal 605 based on a target tuning vector, represented by control inputs 610 as well as a corresponding S-matrix 611.

As mentioned above, source device 310 determines a desired radiating pattern—here, the radiation pattern shown in electromagnetic field graph 606—for target signal 605 based on the complex amplitudes of the fields measured at virtual ports 510. In particular, source device 310 determines a phase-conjugate of reference signal 325, resulting in target signal 605.

In order to generate target signal 605, source device 310 determines an target tuning vector or an optimized impedance vector [$\vec{z}_n$] that maximizes power at a given antenna port ($N_a$), which antenna port is mapped to corresponding metamaterial components 312. This optimized impedance vector results in S-parameters for an S-matrix 611 that approximates the target field amplitude for each antenna port $N_a$ for a given operating frequency. For example, source device 310 may employ least-squares optimization or other techniques determine the optimal impedance vector that would lead to complex field amplitudes at the field-sampling ports ($N_{fs}$) being as close as possible to their desired values.

Typically, source device 310 may determine the optimal impedance vector by calculating an optimized Z-matrix using one or more of a variety of mathematical optimization techniques. For example, the optimal impedance vector may be calculated by finding an optimized Z-matrix based: on an optimization of complex impedance values $z_n$, an optimization of roots of complex values of the impedance values $z_n$, an optimization of reactances associated with the impedance values of the impedance values $z_n$, and/or an optimization of resistivities associated with the impedance values of the impedance values $z_n$. In some embodiments, optimization may be constrained to allow only positive or inductive values of reactances, or only negative or capacitive values of reactances, and/or constrained to only allow for positive or passive values of resistivities.

In addition, the optimal impedance vector may be determined using a global optimization method involving a stochastic optimization method, a genetic optimization algorithm, a Monte-Carlo optimization method, a gradient-assisted optimization method, a simulated annealing optimization algorithm, a particle swarm optimization algorithm, a pattern search optimization method, a multistart algorithm, and/or a global search optimization algorithm. Determining the optimal impedance vector may be at least partially based on one or more initial guesses. Depending on the optimization algorithm used, the optimized values may be local optimizations based on initial guesses and may not in fact be true global optimizations. In other embodiments, sufficient optimization calculations are performed to ensure that a true globally optimized value is identified. In some embodiments, a returned optimization value or set of values may be associated with a confidence level or confidence value that the returned optimization value or set of values corresponds to global extrema as opposed to local extrema. In some embodiments, a Hessian matrix calculation may be utilized that is calculated analytically using an equation relating the S-parameter to the Z-matrix and the optimal impedance vector. In the context of optimization, the Hessian matrix may be considered a matrix of second derivatives of the scalar optimization goal function with respect to the optimization variable vector. A quasi-Newton method may also be employed in some embodiments. In some embodiments, the optimization method may include exhaustively or almost exhaustively determining all local extrema by solving a multivariate polynomial equation and selecting a global extrema from the determined local extrema. Alternative gradient-based methods may be used, such as conjugate gradient (CG) methods and steepest descent methods, etc. In the context of optimization, a gradient may be a vector of derivatives of the scalar optimization goal function with respect to the vector of optimization variables. These and other methods may be used determine the optimal impedance vector, as is appreciated by those skilled in the art.

Still referring to FIG. 6, S-matrix 611 comprises elements $S_N$ that represent complex field magnitudes at antenna ports $N_a$ (mapped to respective metamaterial components 312), and is given by the radius vector $\vec{r}_0$, normalized to the field magnitude at the port. An absolute value $|S_N|$, or the more algebraically convenient quantity $|S_N|^2$, quantifies the quality of field concentration at that point. Maximizing this quantity (or minimizing in the case of forming nulls) represents a generalized beamforming algorithm, as is appreciated by those skilled in the art.

Notably, when there is only one i/o port in the Tx, a simplified alternative algorithm can be run instead of 2d. Using reciprocity, the Tx is analyzed in receive mode. In this situation, the optimum impedance vector represents a vector that maximizes power at the i/o port, given the complex amplitudes at the field-sampling ports ($N_{fs}$). This is substantially simpler (single-optimization-goal) inverse problem to solve, in comparison with the multi-goal problem (or weighted sum of goals).

As mentioned, source device 310 adjusts impedance values to achieve the optimized impedance vector [$\vec{z}_n$] using control inputs 610. In this fashion, source device 310 tunes antenna 311 (and/or metamaterial components 312) to generate target signal 605. Control inputs 314 may include various types of control signals (e.g., direct current signals, alternating current signals, pulse width modulated signals, optical signals, thermal conduction signals, etc.), as is appreciated by those skilled in the art.

Further, depending on manufacturing techniques (e.g., 3D printing) values for the optimum impedance vector may translate trivially into the choices made for the selectable impedance elements mapped to corresponding metamaterial elements 312. In some embodiments, impedance elements are dynamically adjustable, variable, or tunable such that there is a non-trivial relationship between the complex impedance of the elements and the stimuli that control them. In these embodiments, the relationship between the complex impedance of the impedance elements and the control inputs may be based on a magnitude of an applied signal, as is appreciated by those skilled in the art.

Figure 7:
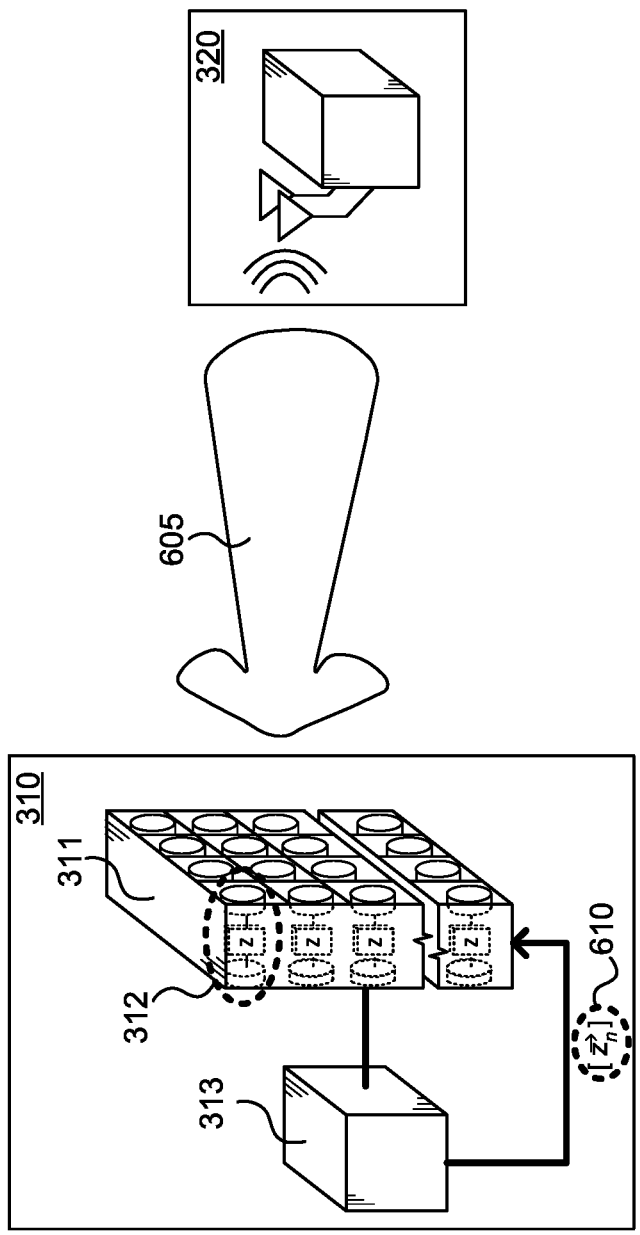
FIG. 7 illustrates a schematic block diagram of the target device and the source device shown in FIG. 3, further showing the source device transmitting the target signal to the target device.

FIG. 7 illustrates a schematic block diagram of source device 310 and target device 320, showing source device 310 transmitting target signal 605 to target device 320. In operation, after computing the optimal impedance vector and corresponding control inputs 610 to adjust antenna 311 and/or metamaterial components 312, source device 310 transmits target signal 605 to target device 320. Target signal 605 is a beam formed signal that may be defined by any desired radiation pattern. For example, the target field amplitudes and corresponding optimal impedance vectors for certain metamaterial components may be calculated or selected to decrease far-field side-lobes, decrease a power level of one or more side-lobes, change a direction of a strongest side-lobe, increase a uniformity of a radiation profile in the near-field, and/or minimize a peak value of field amplitudes in the near-field.

A wide range of adaptive beamforming applications are contemplated and made possible using the beamforming techniques described herein. For example, in some embodiments, beamforming may include a multipath propagation channel involving one or more reflective, refractive, or generally scattering object. In many embodiments, the relevant properties of the multipath propagation channel are incorporated into the Z-matrix. Numerical simulations that lead to a calculation of the Z-matrix may include a model of such a channel. A model of the multipath propagation channel can be simulated using any of a wide variety of simulation software packages, including, for example, ANSYS HFSS, COMSOL RF, CST MWS, etc.

Figure 8A:
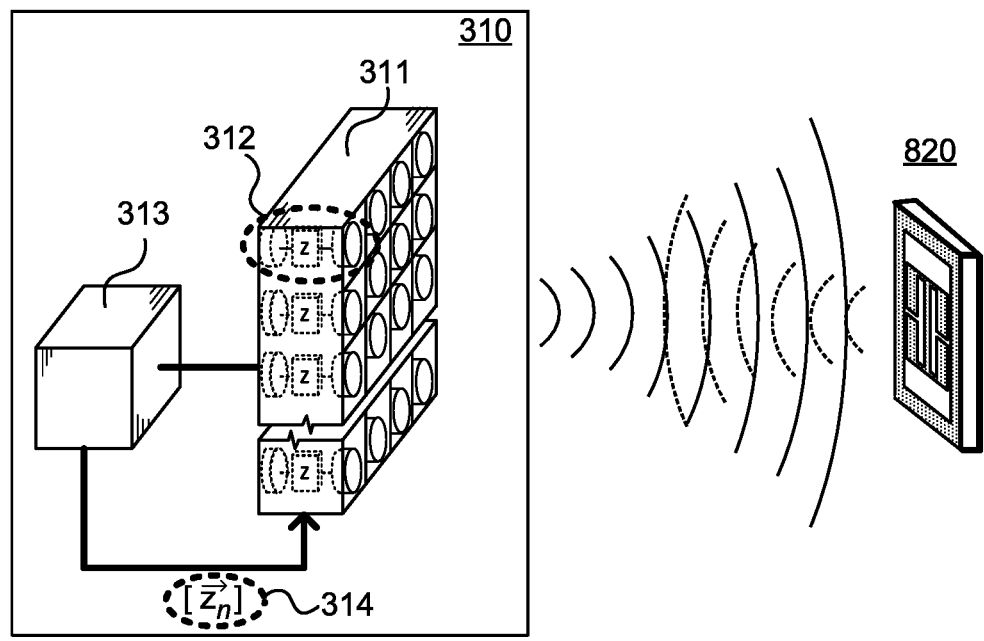
FIG. 8A illustrates a schematic block diagram of an example passive target device communicating with the source device shown in FIG. 3.

FIG. 8A illustrates a schematic block diagram of an example passive target device 820 communicating with source device 310. In this embodiment, target device 820 can represent, for example, a passive radio frequency identification (RFID) receiver/device. Here, target device 820 does not have a local source to generate signals (e.g., reference signals). Instead, target device 820 reflects and radiates reference signals based on signals generated by source device 310. In this fashion, source device 310 may be configured to initially generate a source reference signal, which target device 820 receives and reflects (according to its backscattering hardware configuration) to generate a target reference signal (reflected back to source device 310). The same procedures described above for receiving a reference signal, measuring field amplitudes, determining desired target signal radiation patterns, and calculating appropriate impedance vectors to achieve such target signal radiation patterns can be readily adapted and employed, as is appreciated by those skilled in the art.

Notably, in some instances, additional processes may be employed to reduce or subtract background "noise". These steps may include, for example, time-gating (for sufficiently large separation between Tx and Rx, subtracting background signals measured when the Rx is placed into an "off" (absorbing) state, and/or subtracting background signals measured at a slightly different frequency just outside of the resonant band of the Rx, assuming that the dispersion in the propagation channel is sufficiently small. These additional processes may be employed by any of the above discussed embodiments/configurations.

Figure 8B:
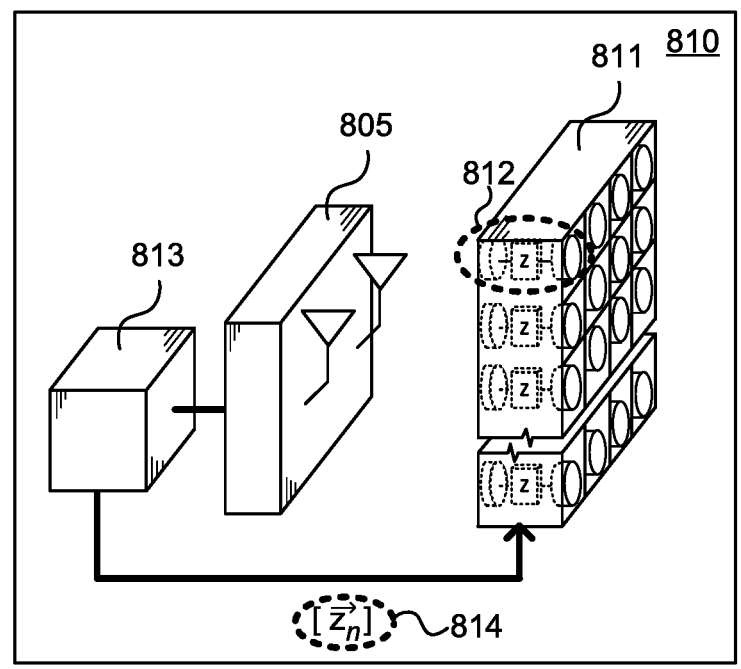
FIG. 8B illustrates a schematic block diagram of an example source device that includes a tunable-medium, according to another embodiment of this disclosure.

In addition, while the above described source devices, such as source device 310, are shown with a network interface/antenna 311 having integrated metamaterial elements 312, it is appreciated that other embodiments of tunable source devices may be also be suitable to employ the time-reversal beamforming techniques disclosed herein. In particular, FIG. 8B illustrates a schematic block diagram of another example source device 810 that includes a tunable-coding aperture 811 in communication with radiating elements 805, according to another embodiment of this disclosure. Here, source device includes a controller 813, radiating elements 805 (e.g., EM radiating elements), and tunable-coding aperture 811 with tunable elements 812 configured to scatter signals according to control input(s) 814 (e.g., impedance values in an impedance vector [$\vec{z}_n$]). In operation, tunable coding aperture 811 operates in conjunction with radiating elements 805 and controller 813 to receive reference signals, determine tunable impedance values, and transmit target signals (e.g., time-reversed beamformed signals) to target devices, as is appreciated by those skilled in the art.

Figure 9:
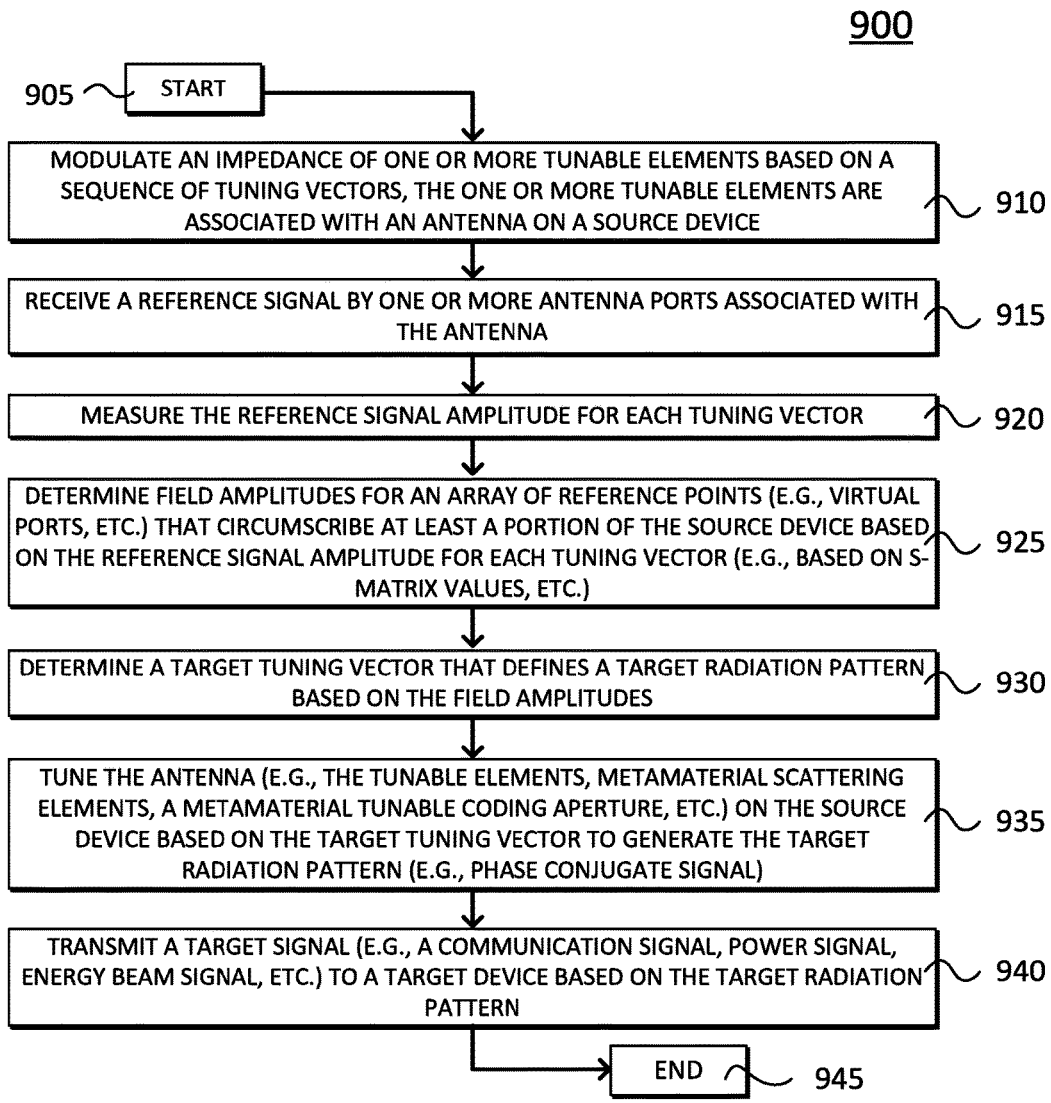
FIG. 9 illustrates an example simplified procedure for time-reversal beamforming using metamaterial antennas, particularly from the perspective of a source device.

FIG. 9 illustrates an example simplified procedure 900 for time-reversal beamforming using metamaterial antennas, particularly from the perspective of a source device such as source device 310.

Procedure 900 begins at step 905 and continues to step 910 where, as discussed above, the source device modulates an impedance of tunable elements associated with its antenna based on a sequence of tuning vectors. For example, the source device can module the impedance for the tunable elements using control inputs 314.

The source device further receives, in step 915, a reference signal (e.g., reference signal 325) transmitted by a target device such as target device 320. The source device further measures a reference signal amplitude for each tuning vector in step 920 and determines, in step 925, field amplitudes for an array of reference points (e.g., virtual ports 510) based on the reference signal amplitude for each tuning vector. Notably, these reference points circumscribe at least a portion of the source device and are preferably defined or spaced about the source device according to a Nyquist sampling rate of one reference point per $(\lambda/2)^2$. In operation, the source device computes S-parameters based on known Z-matrix values as well as the known tunable impedance vector (which describe its tunable elements), as discussed above.

The source device also determines, in step 930, a target tuning vector that defines a target radiation pattern based on the field amplitudes. As mentioned, the target radiation pattern is used to generate a target signal, which can include a beam-formed phase conjugate signal of the reference signal. In order to generate the target signal, the source device tunes, in step 935, its antenna (e.g., tunable elements, metamaterial scattering elements, metamaterial tuning coding apertures, etc.) based on the target tuning vector and transmits, in step 940, the target signal to the target device. Notably, the target signal can include a communication signal, a power signal, an energy beam signal, and the like. In this fashion, the source device can efficiently measure a reference signal, calculate and generate a desired beamformed target signal, and emit or transmit the beam-formed target signal to the target device.

Procedure 900 subsequently ends at step 945, but may continue on to step 910 where, as discussed above, the source device modulates the impedance of its tunable elements. It should be noted that while certain steps within procedure 900 may be optional, and further, the steps shown in FIG. 9 are merely examples for illustration—certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provides efficient techniques for beamforming signals with metamaterial antenna components. These techniques particularly leverage reciprocity (time invariance) of electromagnetic propagation channels that are not "polluted" by non-time-invariant components (such as EM nonlinearities and DC magnetic field generators) using tunable metamaterial components on a source device to provide unique and flexible advantages over traditional signal transmission techniques (e.g., full channel-sounding algorithms present in MIMO systems, etc.). Importantly, these techniques can be employed by a single source device where the target device only needs to periodically (or on demand) transmit a reference signal.

While there have been shown and described illustrative embodiments that provide for beamforming signals between source and target devices, it is to be understood that various other adaptations and modifications may be made within the spirit and scope of the embodiments herein. For example, the embodiments have been shown and described herein with relation specific tunable metamaterial configurations/components on the source device. However, the embodiments in their broader sense are not as limited to such configurations/components, and may, in fact, be used with any number of devices and similar configurations, as is appreciated by those skilled in the art. Accordingly, it is appreciated the features, structures, and operations associated with one embodiment may be applicable to or combined with the features, structures, or operations described in conjunction with another embodiment of this disclosure. Additionally, in many instances, well-known structures, materials, or operations are not shown or described in detail to avoid obscuring aspects of this disclosure.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
   modulating an impedance of one or more tunable elements based on a sequence of tuning vectors, the one or more tunable elements are associated with an antenna on a source device;
   measuring a reference signal amplitude for each tuning vector;
   determining field amplitudes for an array of reference points that circumscribe at least a portion of the source device based on the reference signal amplitude for each tuning vector;
   determining a target tuning vector that defines a target radiation pattern based on the field amplitudes; and
   transmitting a target signal to a target device based on the target radiation pattern;
   wherein the array of reference points comprises one or more virtual ports, wherein determining the field amplitudes for the array of reference points further comprises determining complex field amplitudes for the virtual ports based on scattering matrix (S-Matrix) values associated with each tuning vector; and
   wherein determining the complex field amplitudes further comprises determining the S-matrix values from a pre-determined admittance matrix (Y-Matrix) and a sample tuning vector according to:

$$S=(\sqrt{y}Z\sqrt{y}-1)(\sqrt{y}Z\sqrt{y}+1)^{-1}=(1-\sqrt{z}Y\sqrt{z})(1+\sqrt{z}Y\sqrt{z})^{-1}.$$

2. The method of claim 1, further comprising:
   tuning the antenna on the source device based on the target tuning vector to generate the target radiation pattern.

3. The method of claim 2, wherein the one or more tunable elements include one or more metamaterial scattering elements in operative communication with the antenna, the method further comprising,
   adjusting an impedance of the one or more metamaterial scattering elements to tune the antenna on the source device.

4. The method of claim 2, wherein the one or more tunable elements include a metamaterial tunable coding aperture in operative communication with the antenna, the method further comprising:
   adjusting an impedance of the metamaterial tunable coding aperture to tune the antenna on the source device.

5. The method of claim 1, wherein transmitting the target signal further comprises:
   tuning the one or more tunable elements based on the target tuning vector to generate the target radiation pattern.

6. The method of claim 1, wherein measuring the reference signal amplitude for each tuning vector further comprises:
   receiving a reference signal by one or more antenna ports associated with the antenna.

7. The method of claim 1, wherein the target radiation pattern represents a phase-conjugate of the field amplitudes for the array of reference points.

8. The method of claim 1, wherein the array of reference points define a surface that circumscribes the antenna based on a Nyquist sampling rate of one reference point per $(\lambda/2)^2$.

9. The method of claim 1, wherein the target signal includes at least one of a wireless power signal, a wireless communication signal, or a wireless energy beam.

10. A device, comprising:
an antenna that includes one or more tunable elements;
a processor coupled to the antenna and adapted to execute one or more processes; and
a memory configured to store a process executable by the processor, the process when executed, is operable to:
modulate an impedance of the one or more tunable elements based on a sequence of tuning vectors;
measure a reference signal amplitude for each tuning vector;
determine field amplitudes for an array of reference points that circumscribe at least a portion of the device based on the reference signal amplitude for each tuning vector;
determine a target tuning vector that defines a target radiation pattern based on the field amplitudes; and
transmit a target signal to a target device based on the target radiation pattern;
wherein the array of reference points comprises one or more virtual ports, wherein the process to determine the field amplitudes for the array of reference points is further operable to determine complex field amplitudes for the virtual ports based on scattering matrix (S-Matrix) values associated with each tuning vector; and
wherein the process to determine the complex field amplitudes further is further operable to determine the S-matrix values from a pre-determined admittance matrix (Y-Matrix) and a sample tuning vector according to:

$$S=(\sqrt{\bar{y}}Z\sqrt{\bar{y}}-1)(\sqrt{\bar{y}}Z\sqrt{\bar{y}}+1)^{-1}=(1-\sqrt{\bar{z}}Y\sqrt{\bar{z}})(1+\sqrt{\bar{z}}Y\sqrt{\bar{z}})^{-1}.$$

11. The device of claim 10, wherein the process, when executed, is further operable to:
tune the one or more tunable elements based on the target tuning vector to generate the target radiation pattern.

12. The device of claim 11, wherein the one or more tunable elements include one or more metamaterial scattering elements, wherein the process to tune the one or more tunable elements is further operable to:
adjust an impedance of the one or more metamaterial scattering elements to tune the antenna.

13. The device of claim 11, wherein the one or more tunable elements include a metamaterial tunable coding aperture, wherein the process to tune the one or more tunable elements is further operable to:
adjust an impedance of the metamaterial tunable coding aperture to tune the antenna on the device.

14. The device of claim 10, wherein the process to transmit the target signal is further operable to:
tune the one or more tunable elements based on the target tuning vector to generate the target radiation pattern.

15. The device of claim 10, wherein the process to measure the reference signal amplitude for each tuning vector is further operable to:
receive a reference signal by one or more antenna ports associated with the antenna.

16. The device of claim 10, wherein the target signal includes at least one of a wireless power signal, a wireless communication signal, or a wireless energy beam.

17. A tangible, non-transitory, computer-readable media having instructions encoded thereon, the instructions, when executed by a processor, operable to:
modulate an impedance of one or more tunable elements based on a sequence of tuning vectors, the one or more tunable elements are associated with an antenna on a source device;
measure a reference signal amplitude for each tuning vector;
determine field amplitudes for an array of reference points that circumscribe at least a portion of the source device based on the reference signal amplitude for each tuning vector;
determine a target tuning vector that defines a target radiation pattern based on the field amplitudes; and
transmit a target signal to a target device based on the target radiation pattern;
wherein the array of reference points comprises one or more virtual ports, wherein determining the field amplitudes for the array of reference points further comprises determining complex field amplitudes for the virtual ports based on scattering matrix (S-Matrix) values associated with each tuning vector; and
wherein determining the complex field amplitudes further comprises determining the S-matrix values from a pre-determined admittance matrix (Y-Matrix) and a sample tuning vector according to:

$$S=(\sqrt{\bar{y}}Z\sqrt{\bar{y}}-1)(\sqrt{\bar{y}}Z\sqrt{\bar{y}}+1)^{-1}=(1-\sqrt{\bar{z}}Y\sqrt{\bar{z}})(1+\sqrt{\bar{z}}Y\sqrt{\bar{z}})^{-1}.$$

18. The tangible, non-transitory, computer-readable media of claim 17, wherein the instructions, when executed, are further operable to:
tune the one or more tunable elements based on the target tuning vector to generate the target radiation pattern.

* * * * *